B. Oldfield.
Narrow Ware.

No. 2,378. Reissued Oct. 16, 1866.

Witnesses
Hus Tuck
Wm Frein

Inventor
B Oldfield
per Munn & Co.
attys

N. PETERS, PHOTO-LITHOGRAPHER, WASHINGTON, D. C.

UNITED STATES PATENT OFFICE.

BENJAMIN OLDFIELD, OF NEWARK, NEW JERSEY.

IMPROVEMENT IN LOOMS.

Specification forming part of Letters Patent No. 52,192, dated January 23, 1866; antedated January 17, 1866; Reissue No. 2,378, dated October 16, 1866.

DIVISION A.

*To all whom it may concern:*

Be it known that I, BENJAMIN OLDFIELD, of Newark, Essex county, New Jersey, formerly of Kings county, State of New York, have invented a new and useful Improvement in Looms; and I do hereby declare that the following is a full, clear, and exact description thereof, which will enable others skilled in the art to make and use the same, reference being had to the accompanying drawings, forming part of this specification, in which—

Figure 1:
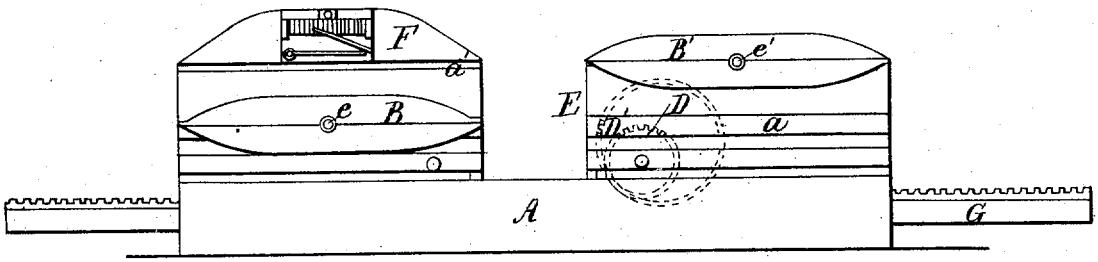
Figure 2:
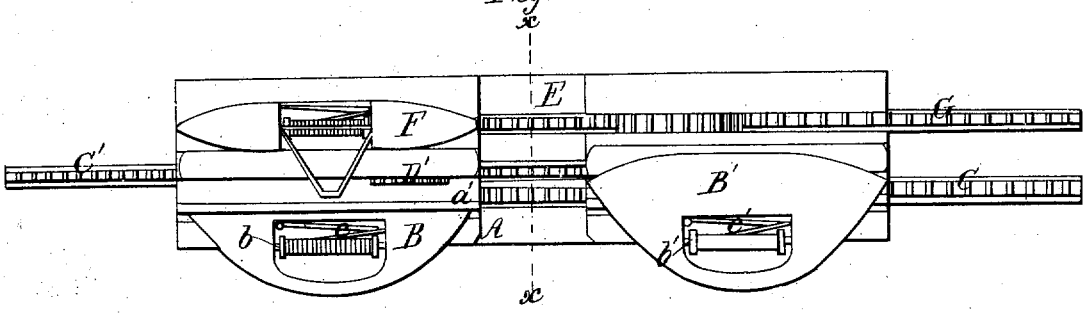
Figure 3:
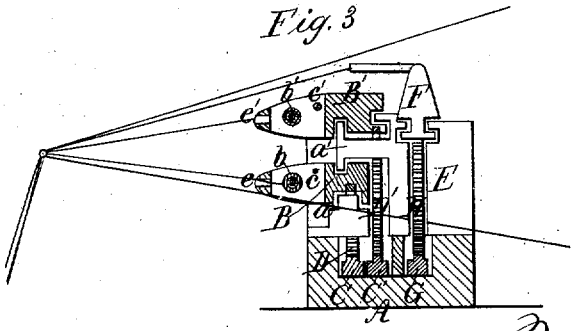

Figure 1 represents a front elevation of this invention. Fig. 2 is a plan or top view of the same. Fig. 3 is a transverse vertical section of the same, the line *x x*, Fig. 2, indicating the plane of section, the shuttles B and B′ being placed in the shed of the warp and shown in cross-section, and the shuttle F in end view.

Similar letters of reference indicate like parts.

This invention relates particularly to looms for weaving figured goods; and it consists in the arrangement of two or more shuttles for carrying the weft for forming the plain portion of the fabric, and one or more shuttles for carrying the weft used in forming the figured part of the same, in such a manner that the shuttles which form the plain part are driven simultaneously through the same opening in the warp or shed, and the figuring shuttle or shuttles are moved at such intervals as the pattern may require, and that by driving two or more shuttles for the plain weaving simultaneously through the same opening much time is saved, and stronger and heavier goods can be produced at less expense than on looms of the ordinary construction.

A represents the batten, which is provided in its breast with two or more grooves to form the guides *a a′* for the shuttles B B′. These shuttles work one above the other, and they are provided with quills *b b′* and tension-springs *c c′*, of well-known construction. They discharge their threads through eyes *e e′*, (see Figs. 1 and 3,) and motion is imparted to them by means of toothed racks C C′, which slide in a suitable groove in the bottom part of the batten, and which gear into cog-wheels D D′, as shown particularly in Figs. 1 and 3.

Two cog-wheels are required for each shuttle, one on either side of the space E, and they gear into suitable cogs in the under sides of the shuttles. Said cog-wheels are so situated that one of them is always in gear with its shuttle, and when the shuttle passes the space it comes in gear with the cog-wheel on the opposite side thereof before it comes out of gear with the wheel which had propelled it up to the space.

Two or more shuttles may be thus arranged, one above the other, and they pass simultaneously through the same opening or shed of the warp, so that for each motion twice as much material is introduced as is used by looms of the ordinary construction, and strong and heavy goods can be produced in a comparatively short time.

The shuttles B B′ operate in conjunction with the shuttle F, which carries the material for figuring the fabric. This shuttle is guided in a groove in the top edge of the batten, and it is propelled by a toothed rack, G, and cog-wheels H, in the same manner as the shuttles B B′, though it must be remarked that other motions may be employed to propel the shuttles; and I do not wish to confine myself to the precise means shown in the drawings, but reserve the right to change the same, as may be desirable.

It is obvious that instead of one figuring-shuttle, two or more such shuttles may be employed. This shuttle is driven through the opening or shed of the warp at such intervals as the pattern may require, and the figuring is produced by the weft, so that every thread shows, and but a small part of the material used for figuring is covered up or concealed by the material used for producing the plain parts of the fabric.

The motion of the figuring shuttle or shuttles alternates with that of the shuttles for plain weaving, and the shed for the figuring shuttle or shuttles is produced by other portions of the harness than those which produce the shed for the shuttles for plain weaving, according to the pattern desired.

This loom is used particularly for weaving figured suspenders or other similar goods, with or without strips of india-rubber, to impart to the same a certain degree of elasticity; but it can be used with advantage for figured goods of any desired description.

I claim as new and desire to secure by Letters Patent—

The application to a batten of two or more shuttles for plain weaving and one or more figuring-shuttles, to operate in conjunction substantially in the manner and for the purpose herein set forth.

The above specification of my reissue signed by me this 18th day of July, 1866.

BENJAMIN OLDFIELD.

Witnesses:

WM. F. MCNAMARA,
ALEX. F. ROBERTS.